July 12, 1955

G. M. LEES 2,712,734

ICE MAKING MACHINE

Filed Sept. 29, 1952

INVENTOR.
Gerald M. Lees
BY Warren D. Horton
Atty.

July 12, 1955

G. M. LEES 2,712,734

ICE MAKING MACHINE

Filed Sept. 29, 1952

INVENTOR.
Gerald M. Lees
BY Warren C. Horton
Atty

July 12, 1955

G. M. LEES 2,712,734

ICE MAKING MACHINE

Filed Sept. 29, 1952

INVENTOR.
Gerald M. Lees
BY
Atty.

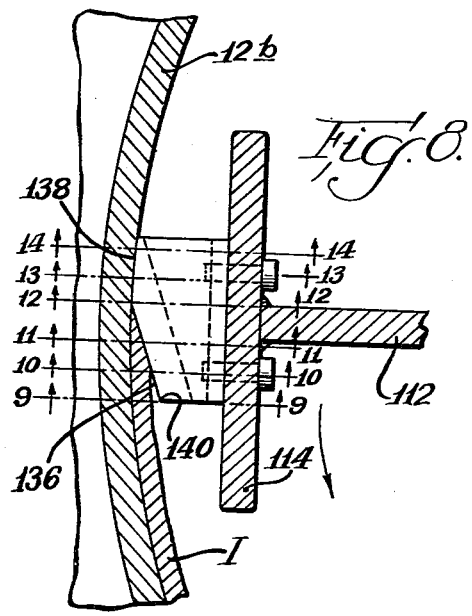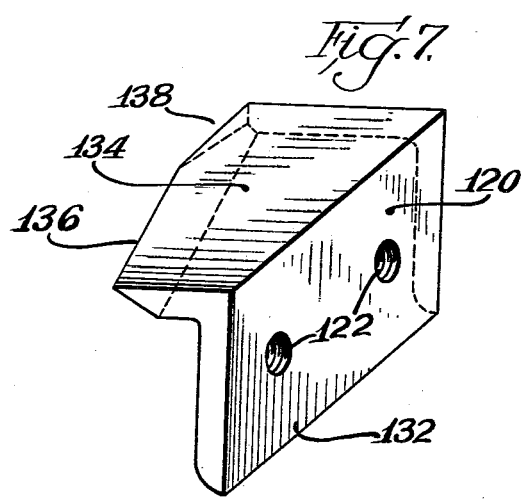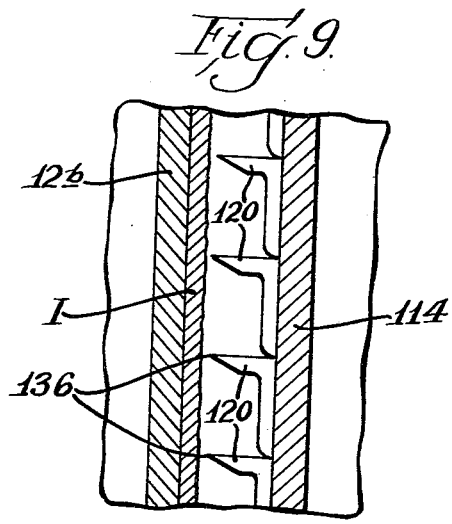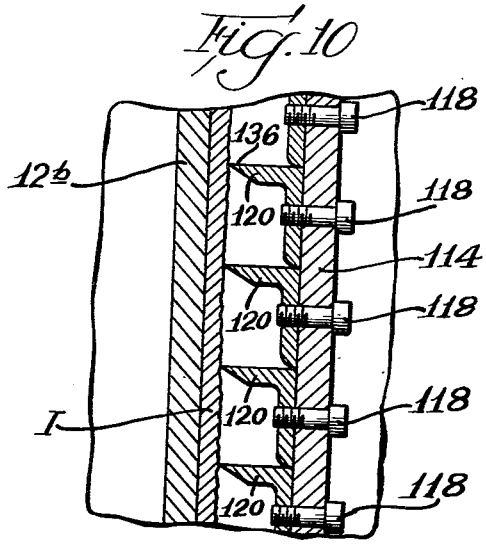

July 12, 1955

G. M. LEES 2,712,734

ICE MAKING MACHINE

Filed Sept. 29, 1952

INVENTOR.
Gerald M. Lees
BY
Atty.

July 12, 1955

G. M. LEES 2,712,734

ICE MAKING MACHINE

Filed Sept. 29, 1952

INVENTOR.
Gerald M. Lees
BY
Darwin C. Horton
Atty.

United States Patent Office 2,712,734
Patented July 12, 1955

2,712,734
ICE MAKING MACHINE
Gerald M. Lees, Seattle, Wash., assignor to Col-Flake Corporation, Chicago, Ill., a corporation of Illinois Application September 29, 1952, Serial No. 311,971

8 Claims. (Cl. 62—107)

My invention relates to ice making machines, and more particularly to improvements in machines for making flake ice as distinguished from machines for making snow ice, and cube or block ice.

Even more specifically my present invention relates to machines utilizing a heat exchanger having a vertically disposed cylindrical inner surface, upon which water is frozen to form a coating of ice, and means for removing the ice from the inner cylindrical surface in the form of flakes or chips.

As is well-known, flake ice is particularly useful in the preservation and cooling of foods and food products and a very high degree of sanitary conditions must be present to prevent the spoilage or contamination of foods or food products with which it may come in contact. Strict standards of cleanliness are set by numerous health and food inspection boards and sanitation laws. It is highly desirable therefore that any machine for making ice for such uses must be simple in construction so that it may be kept clean at all times during operation without costly shut-downs, or dismantling for that purpose.

It is also highly desirable in a machine for making flake ice that the resultant ice product be in flake or chip form, rather than powdered or snow form, and that the ice product be almost quite free from fluid water. Relatively dry flake or chip ice is much easier to handle in use by consumers than either a wet or snowy ice which will be more likely to pack or obstruct drains and the like.

Another essential characteristic in a successful flake ice machine is low cost of construction, operation and maintenance.

It is therefore an object of my invention to provide an improved icemaking machine with improved means for removing the ice therefrom in flakes or chips substantially free from liquid water, powdered ice or snow.

Another object of my invention is to provide a machine of simple construction, which can be operated and maintained at a low cost.

Another object of my invention is to provide an ice making machine which is itself easily cleaned and maintained in a sanitary condition, and from which the ice harvested is clean and uncontaminated.

Another object of my invention is to harvest the ice in such a manner as to separate it from dripping or flowing water, which may, like the ice flakes or chips, be also falling by gravity from the machine.

Another object of my invention is to provide an improved ice forming surface and improved knives or wedging mechanism for removing the ice therefrom.

Another object of my invention is to provide an improved water flow control means for supplying water to the freezing surface in an adjusted quantity, and which means is capable of quick and accurate adjustment, and easily removed for cleaning, repair or replacement.

A further object of my invention is to provide improved means for controlling the water in the circulating system, and means whereby the water supply is automatically replenished whenever the quantity in the supply tank falls below a certain predetermined minimum.

Another object of my invention is to reduce to a minimum relatively moving parts which would require sealing means to prevent leakage.

Another object of my invention is to provide a plurality of improved ice removing knives or wedges, so arranged as to remove all of the ice formed on the freezing surface, and direct it away therefrom to a discharge outlet.

Another object of my invention is to provide means to direct the ice flakes and chips away from the freezing surface to a discharge outlet while permitting excess or dripping water to flow separately into the water reservoirs without wetting the separated ice flakes and chips.

Another object of my invention is to construct a flake or chip ice making machine which operates with simplicity and ease so as to reduce to a minimum power requirements, repair and maintenance, and to avoid the necessity of employing any specially skilled workmen to operate the machine efficiently.

Additional objects and advantages will be apparent from the following description and accompanying drawings, describing a suitable form of my invention.

In the drawings:

Fig. 7 is a front perspective view of one of the ice removing knives of my invention, and used in the machine illustrated.

Fig. 8 is a fragmentary plan, sectional view through the heat exchange member, ice removing knife, and knives carrier;

Fig. 9 is a fragmentary vertical sectional view taken on the line 9—9 of Fig. 8, showing the heat exchange member with ice on the inner wall about to be removed, the front edge of a plurality of the ice removing knives and a portion of the knives carrier;

Fig. 10 is a view generally similar to Fig. 9 taken on the line 10—10 of Fig. 8, as the knives are about to commence cutting and shearing the ice;

Figure 6:
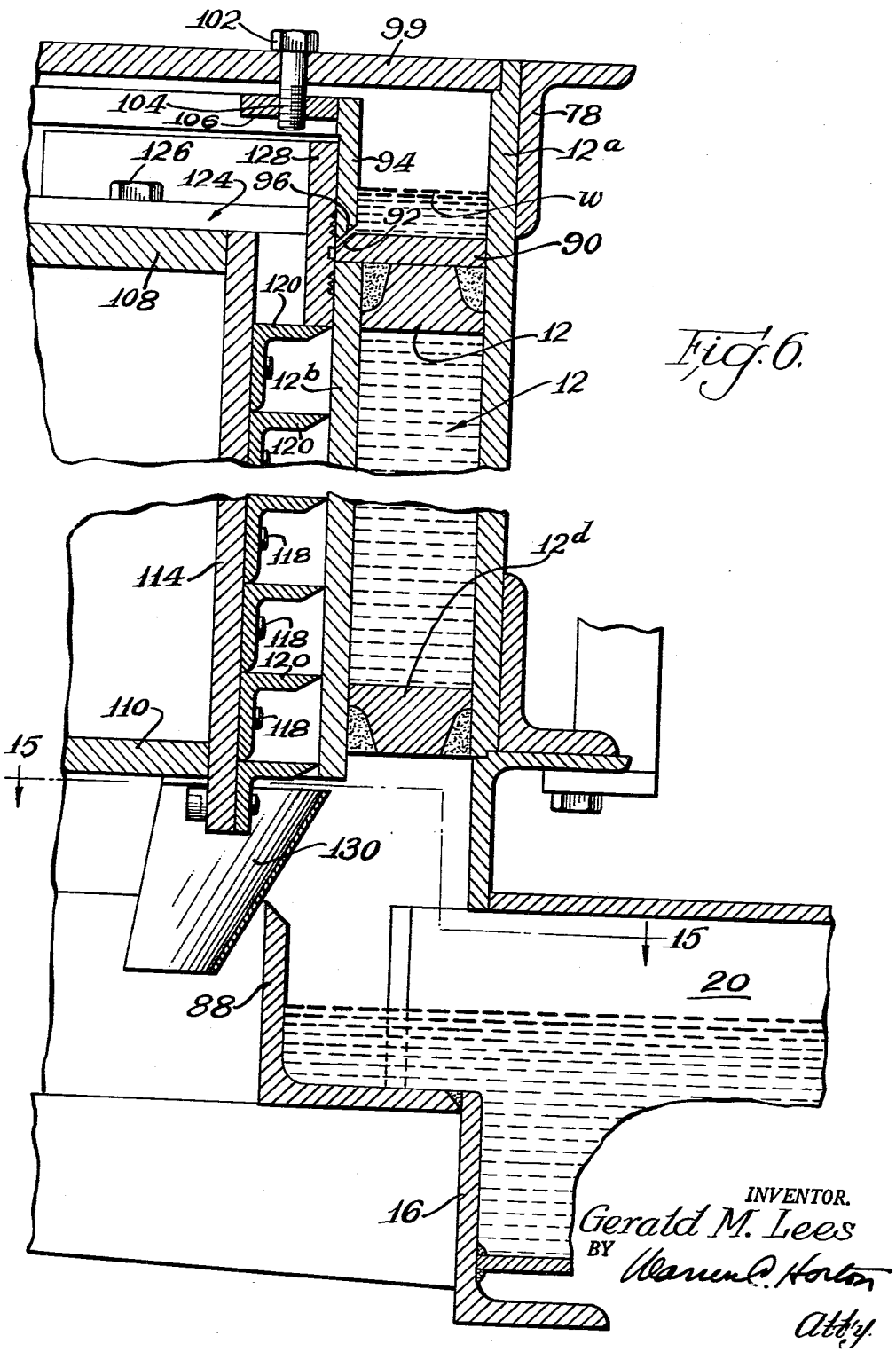
Fig. 6 is an enlarged fragmentary vertical section of the cutting knives carrier, the heat exchange member, the flow control ring, the water reservoir, and generally associated parts, substantially in the same plane as the right side of the same elements as they appear in Fig. 2.
Figure 11:
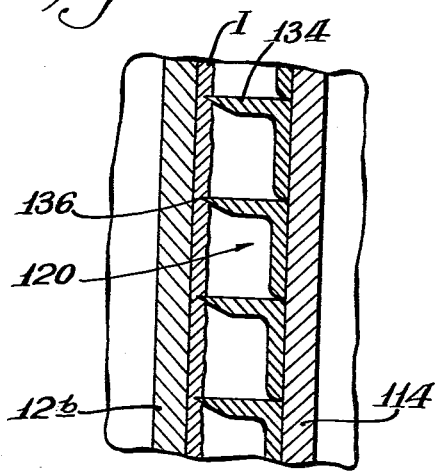
Fig. 11 is another view generally similar to Fig. 9, and Fig. 10, taken on the line 11—11 of Fig. 8, showing the same parts after the knives have commenced the vertical cutting of the ice from the wall of the heat exchange member.
Figure 12:
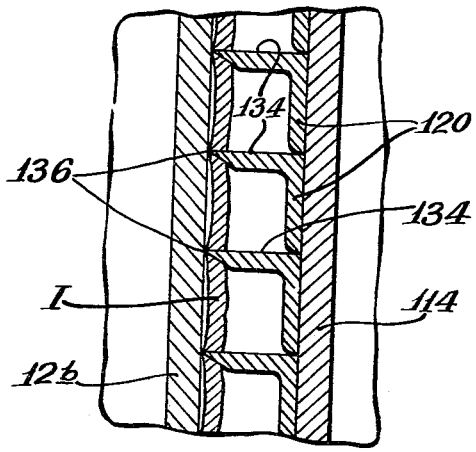
Figure 13:
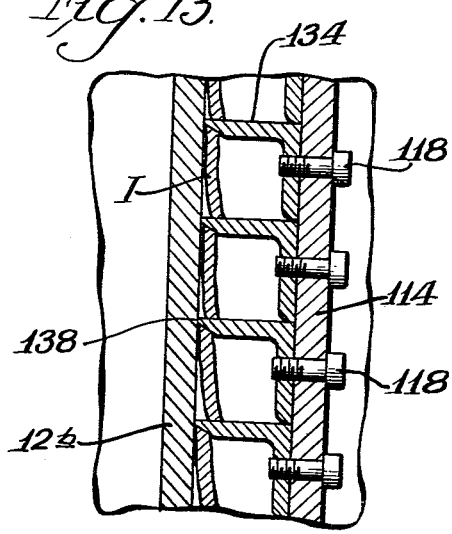
Figure 14:
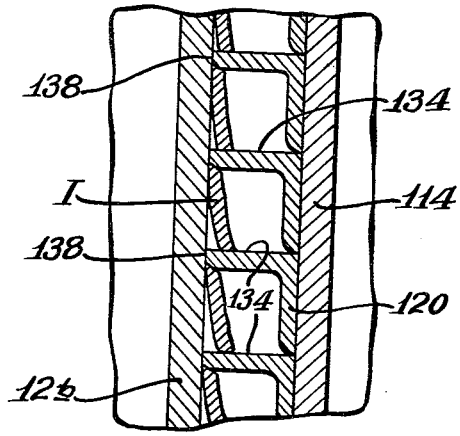
Figure 15:
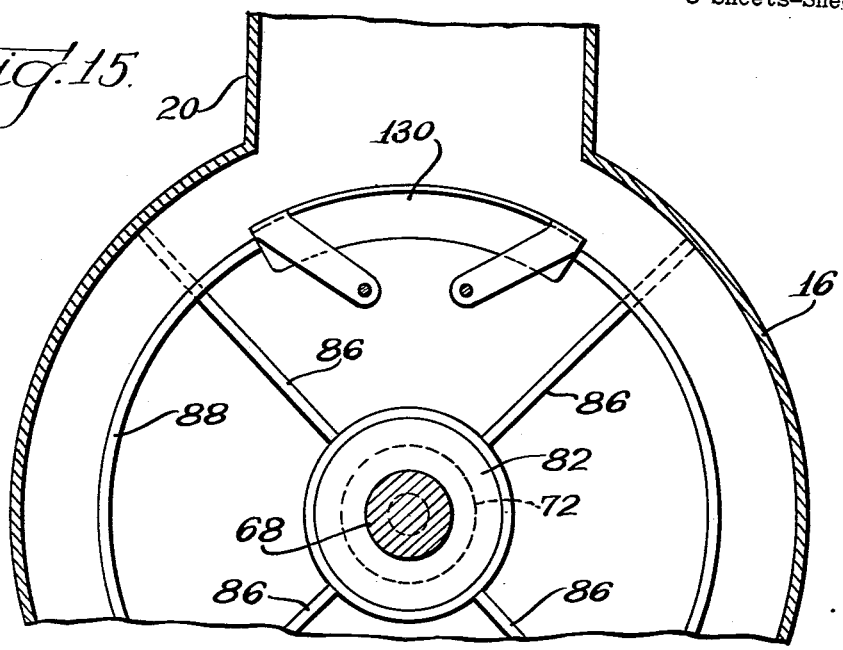
Figure 16:
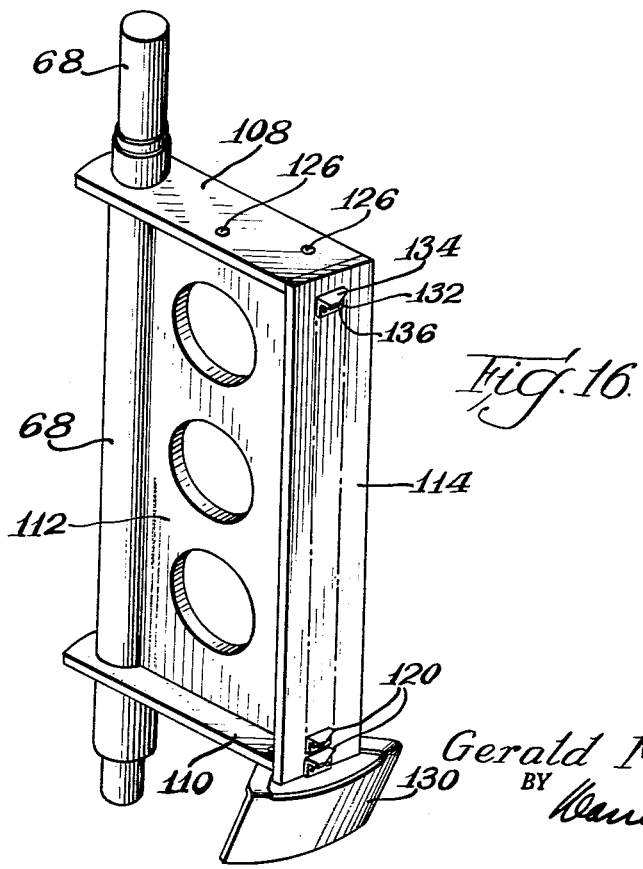

Figs. 12, 13 and 14 are generally similar to Figs. 9, 10, and 11 and illustrate the progressive action as the knives move forward, Fig. 12 showing how the cutting action due to the angle of the knife blade forces the ice flakes or chips away from the wall of the heat exchange member, Fig. 13 illustrating how the space between the blades has decreased further to force the ice from the wall, and Fig. 14 showing the back edges of the knife blades almost as thick as the angle members from which the knives are made engaging the periphery of the heat exchange member wall to separate the chips of ice completely from the wall, so that they may drop by gravity out of the discharge opening at the lower end of the machine;

Fig. 15 is a fragmentary plan sectional view of the discharge spout and associated parts, taken generally on the line 15—15 of Fig. 6; and Fig. 16 is a perspective view of the knives carrier and the discharge spout also carried thereby.

The form of machine utilizing my invention, as shown and described herein, may include a housing 10 for the heat exchange unit 12, an upper housing 14 for the knife carrier drive and associated parts, and a base 16 to which a discharge chute 18 may be attached. A lower water reservoir 20 may be connected to one side of the base 16, the reservoir being connected by a water conduit 22 to a source of water supply. A float valve 24 connected to the conduit 22 is adapted to keep the supply of water at a desired level as shown, the valve being adapted to open whenever the level recedes below a predetermined point. A pump 26 mounted on the top of the reservoir is adapted to pump water through conduits 28 and 30 to an upper reservoir or water header 32 at the top of the heat exchange unit 12. Other necessary elements may include a compressor 34 for circulating the refrigerating medium through inlet conduit 36 to the lower end of the heat exchange unit 12, an upper conduit 38 which connects to a separator 40 and a gas line 42 returning to the compressor 34 in a manner well known in the art.

The pump 26 may be driven from a motor 44 by means of a belt 46 trained about drive pulley 48 on the motor shaft and pulley 50 on the pump shaft, the belt also passing over an idler pulley 52 and an enlarged pulley 54 on the driven shaft 56 of a reducing gear mechanism 58.

The reducing gear mechanism 58 has a vertical shaft 60 with a drive sprocket 62 keyed thereto, the sprocket driving a chain 64 trained about an enlarged sprocket 66 keyed to the cutting knives carrier shaft 68.

The shaft 68 may be mounted in suitable bearing members 70 and 72 at the upper and lower ends of the heat exchange unit 12, the upper bearing member 70 mounted upon a channel-shaped top frame member 74 fastened by bolt members 76 upon a circular angle member 78 secured around the top of cylindrical drum 12a forming part of the heat exchange unit 12. The lower bearing member 72 is carried by a ring-like spider 80 secured in the lower end of the base member 16.

A cover plate 82 and cylindrical shell 84 may surround the bearing and protect the same from flake ice dropping from the heat exchange unit, the spider 80 having a plurality of arms 86 extending inwardly from the periphery of the base. A circular angle shaped discharge member 88 may also be mounted in the base 16 above the spider 80, the same forming in the base a continuation of the lower water reservoir 20.

The heat exchange member 12 may include the cylindrical drum 12a and an inner cylindrical drum 12b, which together with sealing rings 12c adjacent the lower end and 12d adjacent the upper end, form a double-walled heat exchange unit through which the refrigerating medium is circulated so as to freeze a film of ice on the inner surface 12e of the cylindrical member 12b when water is supplied thereto. The conduit for the refrigerating medium thus connects through the outer wall 12a to the cylindrical chamber provided in the heat exchange unit, and the return conduit 38 also connects through the outer wall 12a at a point adjacent the top of the same. In this manner and through the use of a compressor and separator, the heat exchange unit is constantly filled with a refrigerating medium whenever the ice machine is in use.

Figure 4:
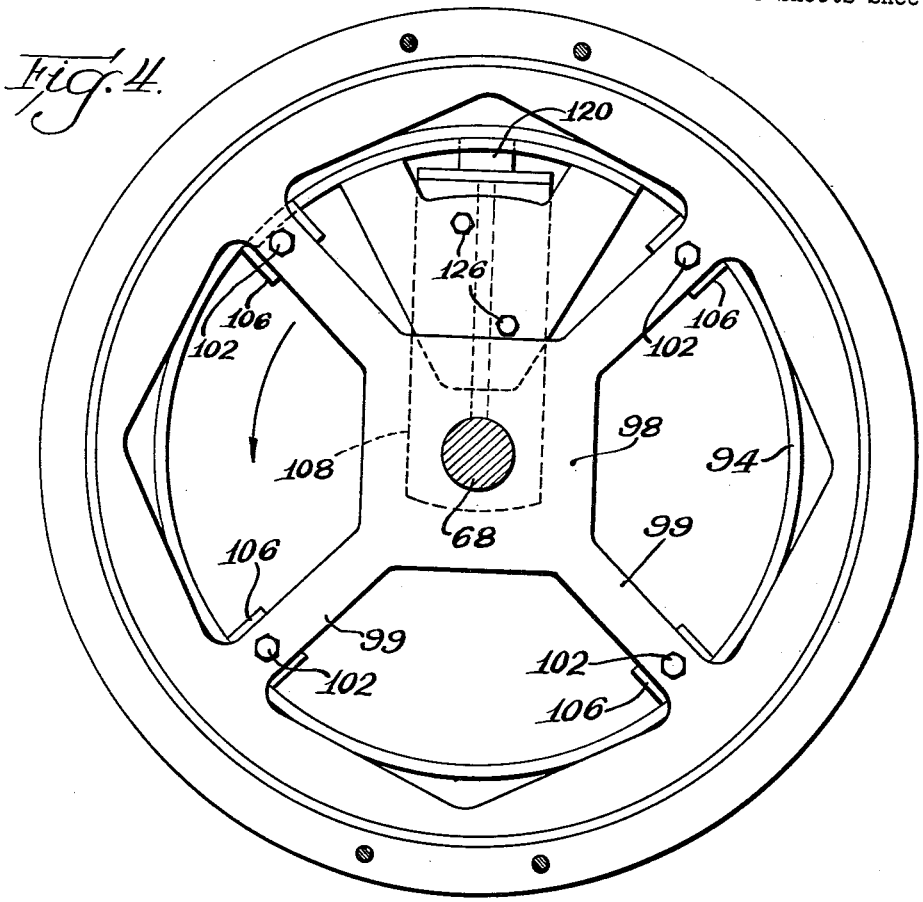
Fig. 4 is a plan sectional view of the heat exchange members and associated parts, taken generally along the line 4—4 of Fig. 2.
Figure 5:
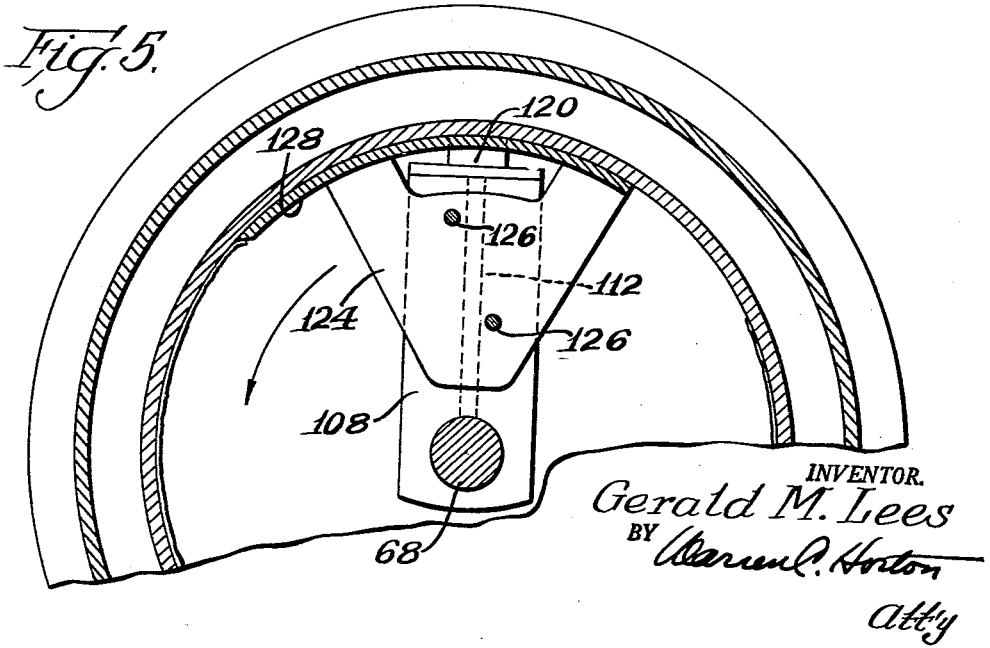
Fig. 5 is a similar fragmentary plan sectional view taken generally along the line 5—5 of Fig. 2.

Referring more specifically to Figs. 4 and 6 of the drawings, it will be noted that the upper end of the stationary drum or unit 12 is provided with a disc-like ring 90 which has an inner beveled edge 92. A flow control ring 94 may be mounted directly above this ring, the lower edge 96 of the same being formed with a taper complementary to the bevel 92. The flow control ring 94 is carried by a spider member 98 having a plurality of arms 99 through which bolt members 102 are mounted. The bolt members 102 are adapted to screw-threadedly engage tapped openings 104 in lugs 106 extending inwardly from the flow control ring 94.

Thus, when the bolt members are rotated in a clockwise direction, the flow control ring will be raised, opening the gap between the complementary edges 92 and 96 of the flat disc 90 and the flow control ring 94 respectively. Since the space between the outer drum member 12a of the heat exchange unit 12 and the flow control ring 94 forms an upper water reservoir W at the top of the unit, it can thus be seen that the width of the opening between the beveled edges will control the rate of flow of water down the surface of the inner drum member 12b; and by adjusting the bolt members 102, the rate of flow of water down the surface of the heat exchange unit is accurately and effectively controlled.

By means of such control, I have found that an excellent water sheet (Reynolds 150–250) in the Reynolds number range may be made, sufficient to meet all requirements for successful freezing, harvesting and separation of ice and water may be obtained with negligible head. It has previously been thought necessary to have a water head of six inches or more, with a correspondingly high initial velocity of five to six feet per second in order to spread and maintain the water in a smooth flat sheet on a refrigerated surface. With my novel orifice type of water feeding, perfect sheets are obtained with heads as low as a quarter-inch. For the purpose of cleaning the facing edges or replacing the flow control ring, the spider 98 can be lifted from the top of the heat exchange unit and repaired or replaced with a minimum of effort.

The shaft 68 which carries the support for the knives that cut through the ice formed on the inner surface of the wall 12b is provided with a frame or knives carrier which includes upper and lower bracket members 108 and 110, a vertical web 112 joining the same, and a vertical plate member 114 provided with a plurality of openings 116 to receive bolt members or other fastening means 118 that fasten a vertically aligned row of knife members 120 to the plate 114.

Figure 1:
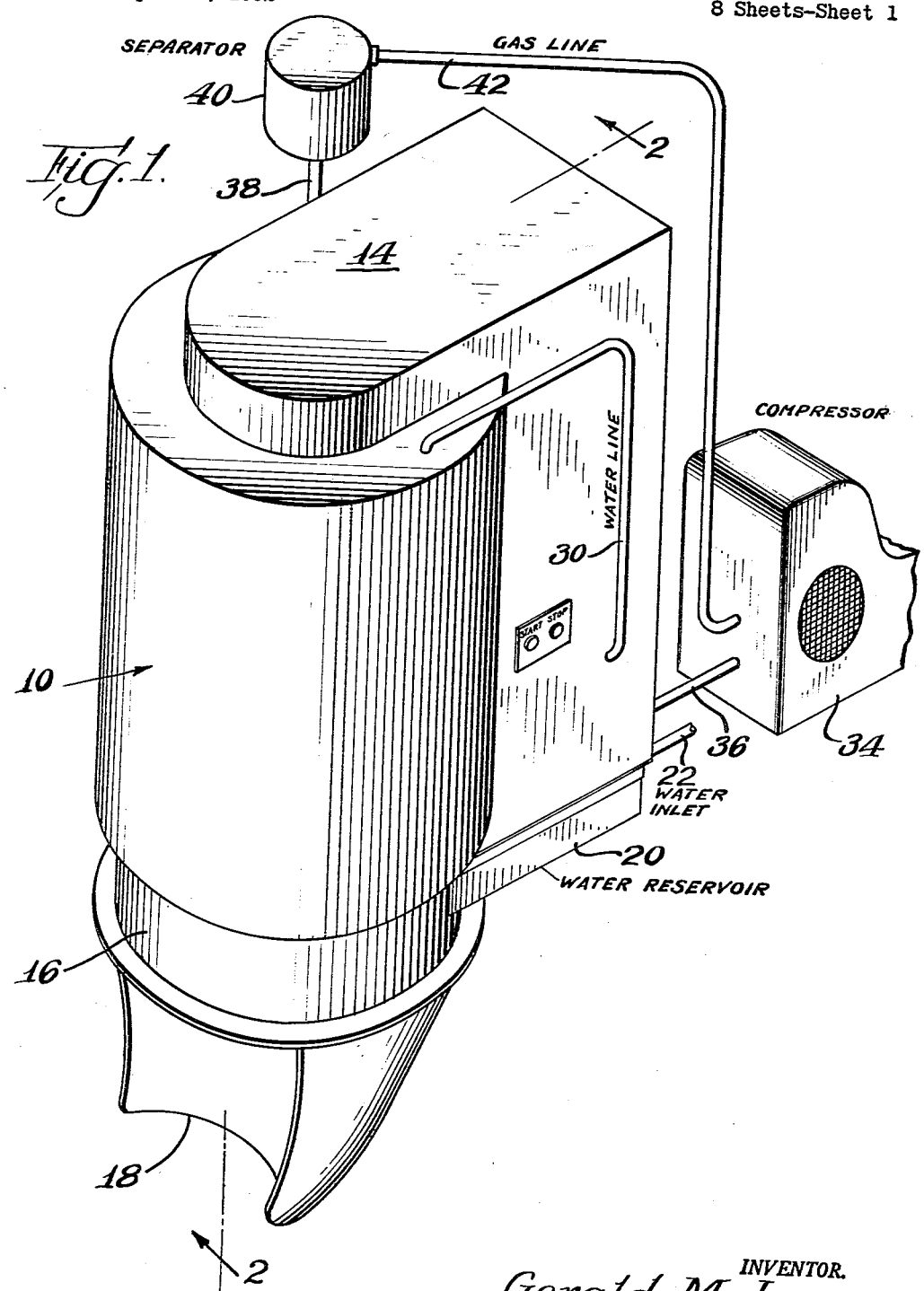
Fig. 1 is a diagrammatic, perspective view of a complete assembly of a suitable machine of my invention.
Figure 2:
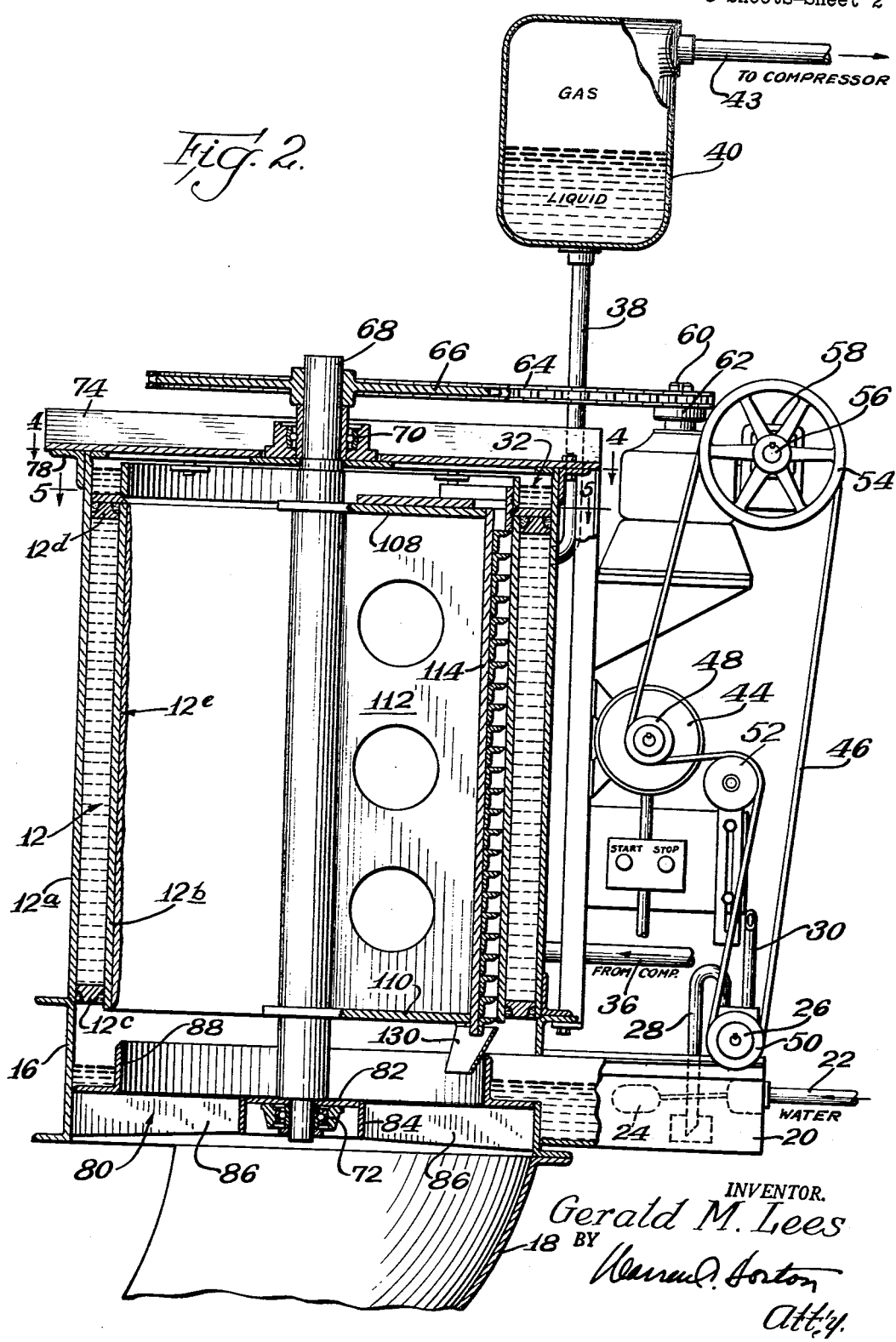
Fig. 2 is a vertical, sectional view of the machine of Fig. 1, with the housing removed and taken generally along the line 2—2 of Fig. 1.
Figure 3:
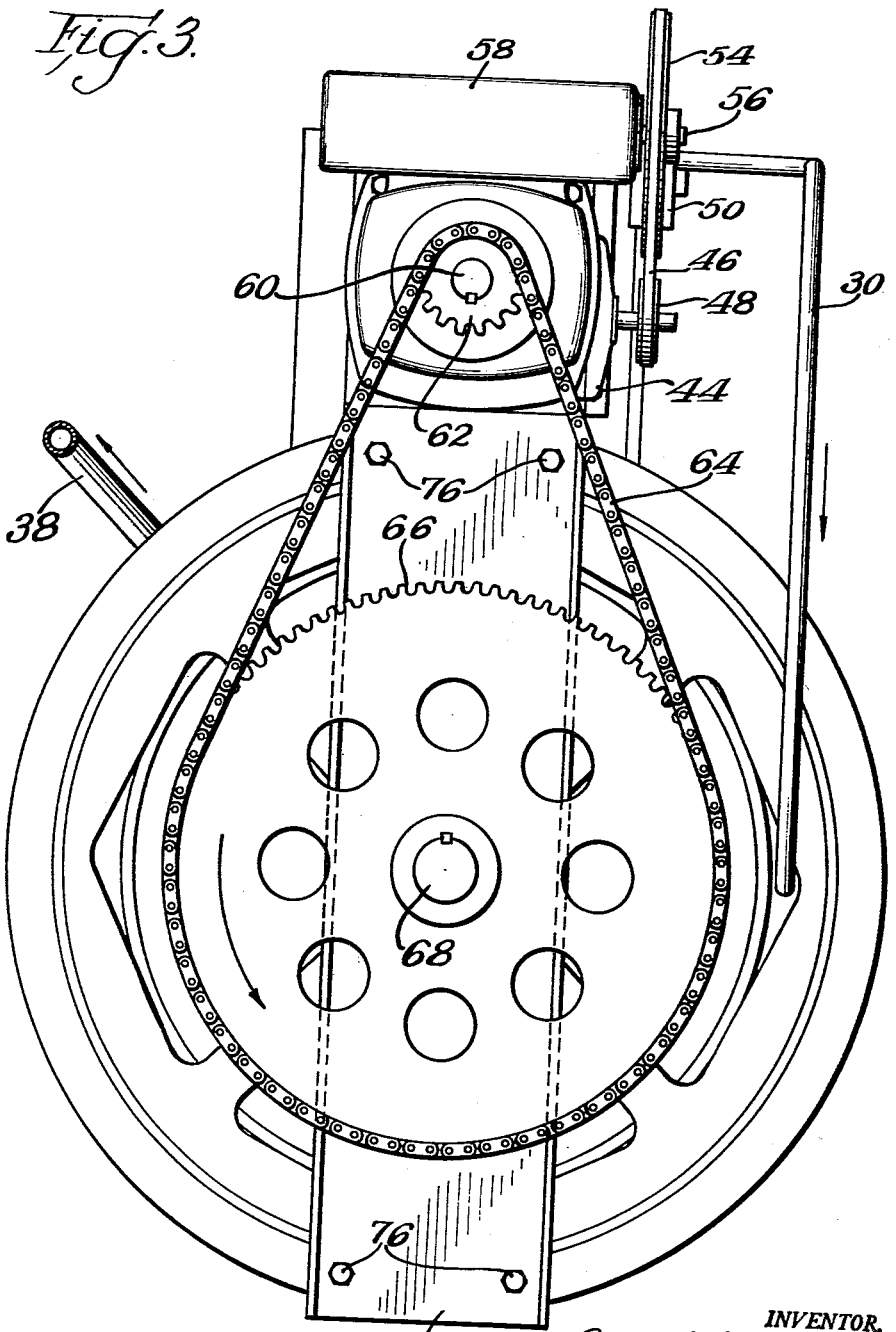
Fig. 3 is a plan view of the machine, with the housing removed.

It will be noted by an examination of both Figs. 2 and 6 that each of the knives 120 is generally formed from an angle member, the particular configuration of which will be explained in further detail hereinafter, each knife member having a pair of tapped openings 122 to receive the bolt members 118 to fasten the knives firmly in position on the face of the plate 114. It will further be noted that the knives are disposed in aligned juxtaposition so that the cutting edge of each knife is adjacent to the lower edge of each other knife.

The knives carrier also has a partial cut-off valve sector 124 fastened to the top of the same by means of bolt members 126, the partial cut-off valve being in the form of a segmental blade 128 which extends in the radius of the internal diameter of the drum 12b as a sector a desired distance on both sides of the knife members 120, for a purpose which will be hereinafter explained.

The lower end of the knives carrier may have a segmentally shaped spout 130 secured thereto below the lower bracket portion 110 for the purpose of directing ice chips or flakes downwardly through the opening 88 in the base of the unit.

The knives 120 best shown in Figs. 7 to 14 inclusive, are generally angle shaped, as shown, having the back wall 132 and the top wall 134. The wall 134 is machined to provide a sharp leading edge 136 which, when fastened to the plate 114 in operative position, is projected in a plane at right angles to the ice making surface of the drum 12b, with a trailing edge 138 ground to the approximate radius of the ice making surface of the drum 12b. Thus it will be noted that the leading point 140 of the knife is removed a finite distance from the ice making surface, from which point it slopes toward a point adjacent the surface and from this point the trailing edge 138 conforms to the radius of the surface for the balance of its length.

The action of the knife in scoring and shearing ice I which has formed on the inner wall of drum 12b is clearly illustrated in Figs. 9 to 14 inclusive, where it can be seen that the leading edge 140 in Fig. 9 is slightly removed from the interior surface of the wall of ice. As the knife moves forward in counterclockwise direction, the section Fig. 10 shows the beginning of the engagement of the sharp leading edge 136 in cutting or scoring into the wall of ice. In Fig. 11 this showing is slightly more advanced, the leading edge of the knives being shown approximately half way through the wall of ice on the inner surface of the drum 12b.

In Fig. 12, which is the section taken at approximately the point of intersection of the tangential portion 138 of the blade, it can be seen that the knives have severed or scored the ice through the thickness of the same to approximately the wall of the drum 12b. Due to the tapered angle of the blade of each knife, it can be seen that the ice sections which are being cut have been compressed slightly, an action which dislodges the ice from the wall.

Fig. 13 illustrates that the trailing edge 138 of the blade which is thicker than the leading edge 136, is compressing the severed ice into a smaller space, thus tending to further move the flakes or chips away from the inner wall of the drum 12b.

In Fig. 14, which is taken at approximately the end of the trailing edge 138 of the knife, the thickness of the edge is aproximately the thickness of the angle member itself, so that the chips or flakes of ice have now been forced into a smaller area than they originally occupied, which results in the tendency of breaking the same completely from the wall, so that as the knife moves in a rotary direction, they will fall by gravity and through the trough 130 be directed through the opening 88 in the base of the unit and out of the chute 18.

The excess water, if any, which may be found upon the wall 12b, will flow down by gravity and be directed into the reservoir 20 from whence it is returned by the pump 26 to the upper reservoir 32 at the top of the unit.

From the above and foregoing description, it can be seen that the action of the knives which I provide and the manner in which they first score and then cut through the ice to the wall of the housing, and then by reason of the change in the configuration of the blade shear or wedge the severed ice away from the wall, provides a highly efficient and complete severance of any and all ice from the surface of the drum 12b so that it will easily drop by gravity and proceed through the chute 18 without permitting any excess water to become comingled with the ice flakes or chips.

It will also be noted from the foregoing description that the flow of water in perfect smooth sheets upon the inner wall of the heat exchange member is accomplished in a novel and simple manner which contributes considerably to the simplicity of operation and construction of the machine, and to the ease of maintenance and cleanliness thereof.

While I have illustrated and described a specific embodiment of the invention, it will be apparent to those skilled in the art that changes and modifications may be made in size, shape and location of the elements shown without departing from my invention and I do not wish to be limited in any particular; rather, what I desire to secure and protect by Letters Patent of the United States is as defined in the following claims.

I claim:

1. In a flake ice making machine, the combination of: a vertical freezing drum having a cylindrical ice-forming surface; means defining an annular water reservoir located above the drum, said means forming an annular water channel extending from the water reservoir to the ice forming surface, whereby water flows from the reservoir to the surface through the channel in a circumferentially continuous thin sheet; and means to remove the ice in flakes as it forms on the freezing surface.

2. In a flake ice making machine, the combination of: a vertical freezing drum having a cylindrical ice-forming surface; means defining an annular water reservoir located above the drum, said means forming an annular water channel extending from the water reservoir to the ice-forming surface, whereby water flows from the reservoir to the surface in a circumferentially continuous thin sheet; a rotor having means to dislodge the ice in flakes along a travelling element of said cylindrical ice-forming surface as the rotor is turned; and a blade of partially cylindrical conformation complementary to the ice-forming surface seated against said ice-forming surface and mounted for rotation with the rotor to obstruct the water channel in the vicinity of said last means to prevent the flow of water in the vicinity thereof.

3. In a flake ice making machine, the combination of: a vertical freezing drum having a cylindrical ice-forming surface; a two part means defining an annular water reservoir located above the drum, one part having an annular face extending from the reservoir to said ice-forming surface and the other part having a complementary annular face to form an annular passage in conjunction with the first face; means supporting said parts in vertically adjustable relation to adjust the area of said passage, whereby water flows from the reservoir to the surface in a circumferentially continuous sheet of adjustable rate of flow; and means to remove the ice in flakes as it forms on the freezing surface.

4. In a flake ice making machine, the combination of: a vertical freezing drum having a cylindrical ice-forming surface; a two-part means defining an annular water reservoir located above the drum, one part having an annular face extending from the reservoir to said ice-forming surface and the other part having a complementary annular face to form an annular passage in conjunction with the first face; means supporting said parts in vertically adjustable relation to adjust the area of said passage, whereby water flows from the reservoir to the surface in a circumferentially continuous sheet of adjustable rate of flow; a rotor having means to dislodge ice in flakes along a travelling element of said cylindrical ice-forming surface as the rotor is turned; and a wiper blade of partially cylindrical conformation complementary to the ice-forming surface seated against said two-part means to obstruct said passage in the vicinity of said last means to prevent the flow of water in the vicinity of the same.

5. A knife for use in a flake ice making machine having a surface upon which ice is formed in a thin sheet, the knife comprising a body having a cutting comparatively thin leading edge and a trailing edge of progressively increased thickness.

6. A flake ice making machine comprising in combination; a freezing member having a face upon which ice is formed; a plurality of vertically aligned knives each having a cutting comparatively thin leading edge and a trailing edge of progressively increased thickness; and means to move the blades across said face in unison to dislodge the ice in flakes therefrom.

7. A flake ice making machine in combination; a freezing member having a face upon which ice is formed; a blade having a two-part edge; and means to move the blade across said surface to dislodge ice in flakes therefrom, one part of the edge of the blade being the leading part and of thin ice scoring conformation and shaped to bite into the ice as the blade progresses and the other part of the edge of the blade being the trailing part and being comparatively thick to dislodge the ice.

8. In a flake ice making machine, the combination of: a vertical freezing drum; means defining a water discharge passage at the top of the drum to flow water thereon for freezing, said passage extending entirely about the circumference of the drum to form a circumferentially uniform sheet of water thereon; a rotor having means to dislodge ice in flakes along a travelling element of said cylindrical ice-forming surface as the rotor is turned; and a blade of partially cylindrical conformation complementary to the ice-forming surface and mounted for rotation with the rotor to obstruct the water channel in the vicinity of the last means to prevent the flow of water in the vicinity of the same.

References Cited in the file of this patent

UNITED STATES PATENTS

| | | |
|---|---|---|
| 254,048 | Robertshaw | Feb. 21, 1882 |
| 1,020,759 | Holden | Mar. 19, 1912 |
| 2,063,770 | Taylor | Dec. 8, 1936 |
| 2,259,215 | Scheurer | Oct. 14, 1941 |
| 2,310,468 | Short | Feb. 9, 1943 |
| 2,556,510 | Topping | June 12, 1951 |
| 2,575,374 | Walsh | Nov. 20, 1951 |
| 2,585,020 | Lessard | Feb. 12, 1952 |
| 2,585,021 | Lessard | Feb. 12, 1952 |
| 2,659,212 | Lees | Nov. 17, 1953 |
| 2,683,357 | Albright | July 13, 1954 |